United States Patent
Taller (10) Patent No.: US 9,021,051 B1
(45) Date of Patent: Apr. 28, 2015

(54) PROVIDING SELECTIVE RETRIEVAL OF DATA OBJECTS FROM A NETWORK SERVICE

(71) Applicant: Benjamin Taller, Berkeley, CA (US)

(72) Inventor: Benjamin Taller, Berkeley, CA (US)

(73) Assignee: Kabam, Inc., San Francisco, CA (US)

( * ) Notice: Subject to any disclaimer, the term of this patent is extended or adjusted under 35 U.S.C. 154(b) by 331 days.

(21) Appl. No.: 13/648,125

(22) Filed: Oct. 9, 2012

(51) Int. Cl.
*H04L 29/08* (2006.01)
*G06F 17/30* (2006.01)

(52) U.S. Cl.
CPC .... *H04L 29/08729* (2013.01); *G06F 17/30097* (2013.01); *G06F 17/30628* (2013.01)

(58) Field of Classification Search
None
See application file for complete search history.

(56) References Cited

U.S. PATENT DOCUMENTS

| | | | |
|---|---|---|---|
| 7,065,555 B2 | 6/2006 | Foulger et al. | 709/206 |
| 7,523,500 B1 | 4/2009 | Szor et al. | 726/24 |
| 8,661,428 B2 * | 2/2014 | Clark | 717/170 |
| 2008/0104198 A1 * | 5/2008 | Kamath et al. | 709/217 |
| 2009/0305680 A1 | 12/2009 | Swift et al. | 455/414.1 |
| 2009/0307302 A1 * | 12/2009 | Tennant et al. | 709/203 |
| 2010/0250649 A1 * | 9/2010 | Larsson et al. | 709/203 |
| 2011/0078534 A1 | 3/2011 | Resch | 714/752 |
| 2012/0016904 A1 | 1/2012 | Mahajan et al. | 707/769 |

* cited by examiner

*Primary Examiner* — Ario Etienne
*Assistant Examiner* — Clayton R Williams
(74) *Attorney, Agent, or Firm* — Pillsbury Winthrop Shaw Pittman LLP (57) ABSTRACT

Data objects may be selectively retrieved from a network service such that a network data object corresponding to a cached data object may be retrieved responsive to a determination that a network-object hash associated with the network data object and a cache-object hash associated with the cached data object do not match. In some implementations, a network-object hash associated with a network data object at the network service may be generated. The network-object hash may be provided to a client device. The client device may have non-transient electronic storage media that store a cache that includes a cached data object that corresponds to the network data object. A request from the client device may be obtained. Initiation of the request by the client device may be responsive to a determination that the network-object hash and a cache-object hash associated with the cached data object do not match.

12 Claims, 5 Drawing Sheets

| Object Name | Network Address | MD5 Hash |
|---|---|---|
| Object1 | http://www.game1.com/Object1.file | [hash1.0] |
| Object2 | http://www.game1.com/Object2.file | [hash2.0] |
| Object3 | http://www.game1.com/Object3.file | [hash3.0] |
| Object4 | http://www.game1.com/Object4.file | [hash4.0] |
| Object5 | http://www.game1.com/Object5.file | [hash5.0] |
| Object6 | http://www.game1.com/Object6.file | [hash6.0] |

| Object Name | Network Address | MD5 Hash |
|---|---|---|
| Object1 | http://www.game1.com/Object1.file | [hash1.1] |
| Object2 | http://www.game1.com/Object2.file | [hash2.0] |
| Object3 | http://www.game1.com/Object3.file | [hash3.1] |
| Object4 | http://www.game1.com/Object4.file | [hash4.0] |
| Object5 | http://www.game1.com/Object5.file | [hash5.0] |
| Object6 | http://www.game1.com/Object6.file | [hash6.1] |
| Object7 | http://www.game1.com/Object7.file | [hash7.1] |
| Object8 | http://www.game1.com/Object8.file | [hash8.1] |

PROVIDING SELECTIVE RETRIEVAL OF DATA OBJECTS FROM A NETWORK SERVICE

FIELD OF THE DISCLOSURE

This disclosure relates to selective retrieval of data objects from a network service by comparing network-object hashes associated with network data objects and cache-object hashes associated with cache data objects.

BACKGROUND

In recent years, service providers have enabled users to interact with computer-simulated environments, such as virtual spaces, virtual worlds, video games, or other environments, over the Internet. Nonetheless, in many instances, technologies utilized to enable the user interaction may not have been designed for computer-simulated environments and, therefore, may be limited with respect to supported functions. For example, while many online games are created for and played with Adobe Flash, the technology is not designed for gaming. As a result, one of the design limitations includes the inability of users of such online games to specify a storage location on a hard disk for saving files after the first game session. Thus, service providers typical rely on a web or browser cache of a client device to save game asset data after the asset data is downloaded to the client device.

To ensure that each game session utilizes the most up-to-date assets, gaming service administrators generally initiate manual breaking of cache rights for a group of files after at least some files in the group have been modified, causing the client device to download the entire group of files. For example, an administrator may manually change the group location of each file group that the administrator knows contains at least one file that has been updated since the previous game deploy (e.g., to cause the URLs (Uniform Resource Locators) of all the files in each group to change). As such, client devices may be caused to download all of the files of each group that had its group location on the game server changed. However, such manual breaking of cache rights may be labor-intensive and prone to human errors (e.g., the administrator may overlook a group with updated files), and may utilize significantly more network resources than necessary (e.g., since all the files of an entire group will be downloaded despite some files in the group remaining unmodified from the previous game deploy). Accordingly, alternative approaches to manual breaking of cache rights may be advantageous.

SUMMARY

One aspect of the disclosure relates to a system configured to facilitate selective retrieval of data objects from a network service, in accordance with one or more implementations. In exemplary implementations, the data objects may be selectively retrieved by comparing network-object hashes associated with network data objects and cache-object hashes associated with cache data objects. In this way, a client device may selectively retrieve individual data objects at the network service that have been updated (e.g., from the version of the corresponding data objects that are cached at the client device), while retrieving unchanged data objects from its cache. As a result, among other advantages, network resource waste caused by typical retrieval techniques such as manual breaking of cache rights of file groups may be mitigated. In certain implementations, the network service may be associated with one or more of a virtual world, a virtual space, or a video game. In some implementations, the system may include one or more servers. The server(s) may be configured to communicate with one or more client devices according to a client/server architecture. The users may access the system via the client device(s).

The server(s) may be configured to execute one or more computer program modules. The computer program modules may include one or more of a hash generation module, a network update module, an object manager module, and/or other modules.

The hash generation module may be configured to effectuate generation of a plurality of network-object hashes associated with individual ones of a plurality of network data objects at the network service. In certain implementations, the network update module may be configured to determine whether the network data objects have been updated, and the generation of the network-object hashes may be responsive to a determination by the network update module that the network data objects have been updated.

The network update module may be configured to provide the network-object hashes to the client device. The client device may include non-transient electronic storage media that store a cache that includes a plurality of cached data objects. The cached data objects may include a first cached data object that corresponds to a first network data object of the network data objects. For example, the first network data object may be one or more of a modified version, a different version, or a new version of the first cached data object.

The object manager module may be configured to obtain a request from the client device for the first network data object. By way of example, initiation of the request by the client device may be responsive to a determination that a first hash of cache-object hashes and a second hash of the network-object hashes do not match. The cache-object hashes may, for instance, be associated with individual ones of the cached data objects. The first hash may be associated with the first cached data object, and the second hash may be associated with the first network data object. The network-object hashes and the cache-object hashes may be one or more of MD5 hashes and/or hashes that are generated using any other hashing technologies.

In various implementations, a comparison at the client device between a first address associated with the first cached data object and a second address associated with the first network data object may cause the determination that the first and second hashes do not match. The first address may include the first hash, the second address may include the second hash, and the first and second addresses may include a network address associated with the first cached data object and the first network data object.

The client device(s) may be configured to execute one or more computer program modules. The computer program modules may be configured to enable an expert or user associated with the client device to interface with the system and/or provide other functionality attributed herein to client device(s). The computer program modules may include one or more of a browser module, an object record module, an update record module, an object retrieval module, an address generation module, a comparison module, a caching module, and/or other modules.

In some implementations, the client device may include non-transient electronic storage media that store a cache that includes a plurality of cached data objects such that cached data objects may include a first cached data object. For example, the cache may be one or more of a web cache or a browser cache associated with the client device.

The browser module may execute one or more browser applications, such as a web browser and/or other browser applications. The browser module may be configured (e.g., via the browser applications) to present information to a user, receive information from the user, and/or otherwise facilitate the user interacting with system 100.

The object record module may be configured to obtain a plurality of cache-object hashes associated with individual ones of the cached data objects such that the cache-object hashes may include a first hash associated with the first cached data object.

The update record module may be configured to obtain a plurality of network-object hashes associated with individual ones of a plurality of network data objects at the network service. At least some of the network data objects may correspond to the cached data objects such that the network data objects may include a first network data object that correspond to the first cached data object. The network-object hashes may include a second hash associated with the first network data object. By way of example, the first network data object may one or more of a modified version, a different version, or a new version of the first cached data object.

The object retrieval module may be configured to obtain the first network data object from the network service responsive to a determination that the first and second hashes do not match. The object retrieval module may be configured to effectuate bypass of the obtaining of the first network data object from the network service responsive to a determination that the first and second hashes match.

According to certain implementations, the object record module may be configured to obtain a first address that includes a plurality of portions. The portions may include a first portion that specifies a network address associated with the first cached data object and the first network data object, and a second portion that specifies the first hash. In some implementations, the address generation module may be configured to effectuate generation of a second address using the network address and the second hash.

The comparison module may be configured to effectuate comparison of the first and second addresses such that the comparison may cause the determination that the first and second hashes do not match. For example, the comparison module may determine that the first and second hashes do not match responsive to a determination that the first and second addresses do not match (e.g., the first and second addresses may include the same network address with different hashes appended to the end of the network address).

The caching module may be configured to effectuate storage of the first network data object in the cache responsive to the obtaining of the first network data object from the network service.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
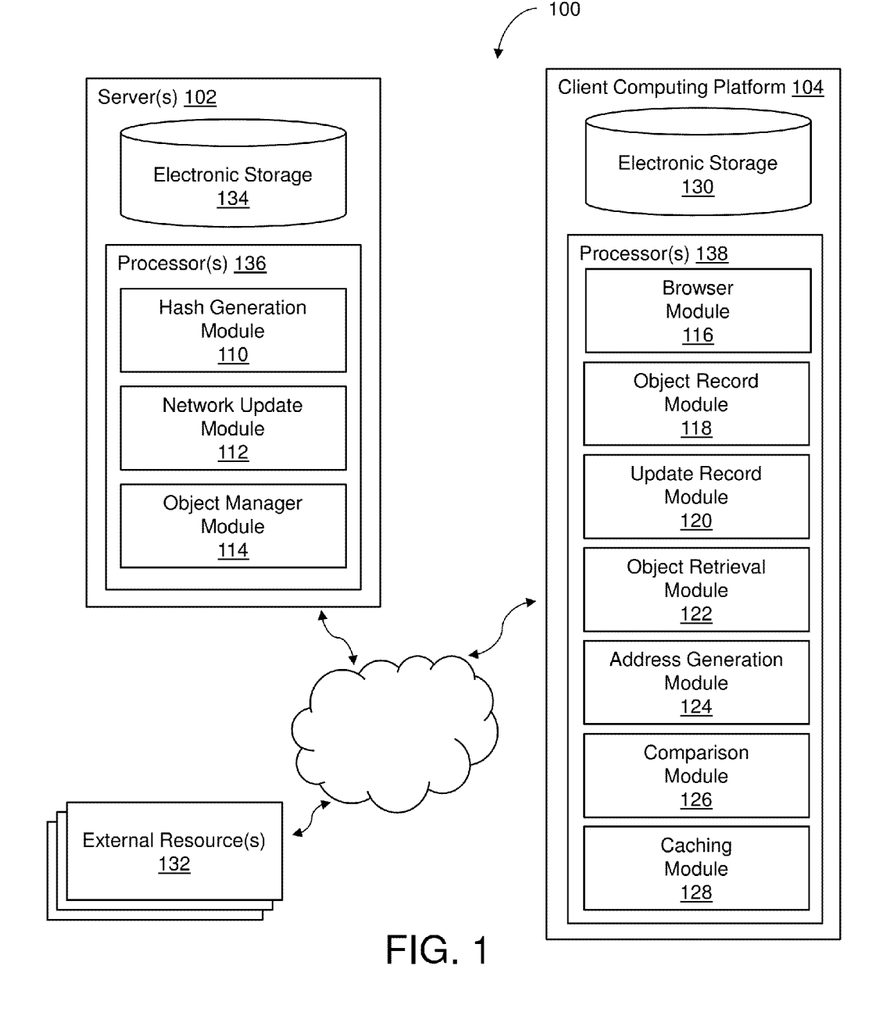
FIG. 1 illustrates a system configured to facilitate selective retrieval of data objects from a network service, in accordance with one or more implementations.

FIG. 1 illustrates a system 100 configured to facilitate selective retrieval of data objects from a network service, in accordance with one or more implementations. In exemplary implementations, the data objects may be selectively retrieved by comparing network-object hashes associated with network data objects and cache-object hashes associated with corresponding cache data objects. In this way, a client device may selectively retrieve individual data objects at the network service that have been updated (e.g., from the version of the corresponding data objects that are cached at the client device), while retrieving unchanged data objects from its cache. Accordingly, among other advantages, network resource waste caused by typical retrieval techniques such as manual breaking of cache rights of file groups may be mitigated. In certain implementations, the network service may be associated with one or more of a virtual world, a virtual space, or a video game. In some implementations, system 100 may include one or more servers 102. The server(s) 102 may be configured to communicate with one or more client devices 104 according to a client/server architecture. The users may access system 100 via client device(s) 104.

The server(s) 102 may be configured to execute one or more computer program modules. The computer program modules may include one or more of a hash generation module 110, a network update module 112, an object manager module 114, and/or other modules.

Figure 2A:
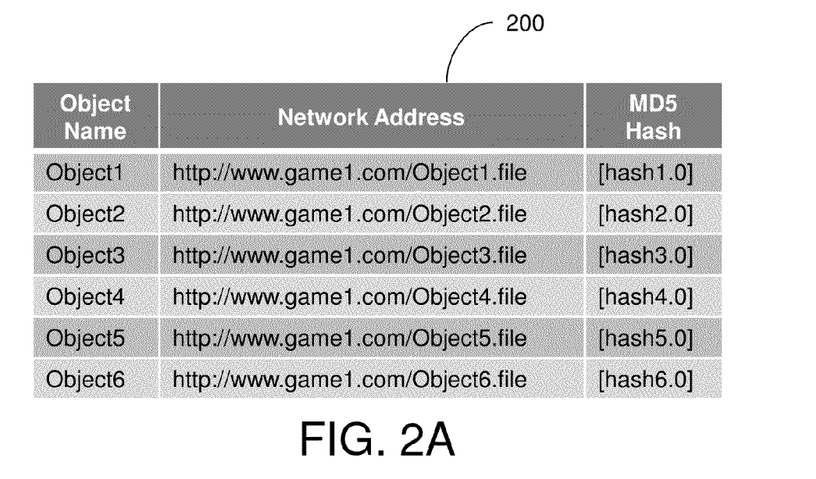
FIGS. 2A and 2B illustrate tables depicting file information associated with initial and subsequent builds of a game, respectively, in accordance with one or more implementations.
Figure 2B:
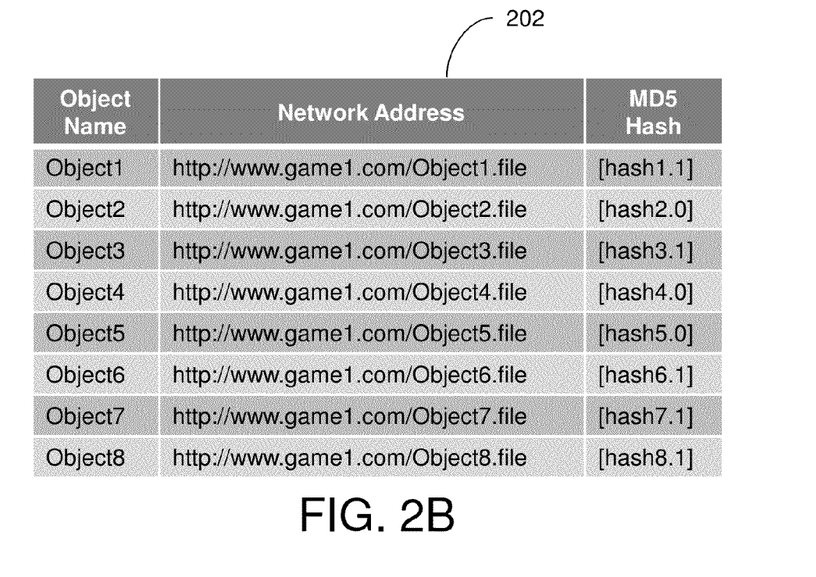

The hash generation module 110 may be configured to effectuate generation of a plurality of network-object hashes associated with individual ones of a plurality of network data objects at the network service. For example, FIGS. 2A and 2B illustrate tables 200 and 202 depicting file information associated with initial and subsequent builds of a game, respectively, in accordance with one or more implementations. Table 200 may, for instance, depict file information associated with an initial build of files downloaded from server 102 of the network service to a client device 104, while table 202 may depict file information associated with a subsequent build of files on the server 102. As shown, the column of "Object Names" may include a list of identifiers for the files, the column "Network Address" may include at least portions of corresponding URLs that may be used to access the files on the server 102, and the column "MD5 hash" may include a list of corresponding MD5 hashes of the binary data of the files.

In one example scenario, an online game of the network service may utilize an initial set of art assets (e.g., objects of table 200) to implement a computer-simulated environment for the game. The network service may loop through the asset files and generate the list of MD5 hashes of table 200. When a user connects to the network service to play the game for the first time, the network service may provide the user's client device 104 with the table 200. The client device 104 may then download all the asset files using addresses generated by appending the corresponding MD5 hashes to the corresponding network addresses (e.g., Object1 of the initial build may be downloaded using the address "http://www.game1.com/Object1.file/[hash1.0]"). In some implementations, the addresses may be generated at the client device 104 using the table 200, generated at the server 102, or generated at some other device. Upon downloading of the asset files, the client device 104 may store the asset files in its cache based on their respective generated addresses (e.g., Object1 may be stored in association with "http://www.game1.com/Object1.file/[hash1.0]").

According to certain implementations, the network update module 112 may be configured to determine whether the network data objects have been updated, and the generation of the network-object hashes may be responsive to a determination by the network update module 112 that the network data objects have been updated. Thus, with respect to the above example scenario of FIGS. 2A and 2B, a subsequent build of the game may be implemented on the network service, resulting in changes, updates, and/or modifications to at least some of the asset files of the initial build. The network service may then loop through the asset files of the subsequent build and generate a list of MD5 hashes of the asset files of the subsequent build. In some implementations, the generation of the list of MD5 hashes of the subsequent build may be triggered manually by an administrator who knows that the subsequent build has been implemented, automatically based on detection of file changes, and/or in other ways. Because MD5 hashing may be performed on the binary data of the asset files, a current hash associated with an asset file may be different from a previous hash of the asset file if the asset file has changed. In this way, the current hash and the previous hash of the asset file may be utilized to determine whether the asset file has changed and, thus, whether to download the asset file from the network service (e.g., if the current and previous hashes of the asset file are different) or to retrieve the asset file from the cache (e.g., if the current and previous hashes of the asset file are the same).

The network update module 112 may be configured to provide the network-object hashes to the client device 104. As discussed, the client device 104 may include non-transient electronic storage media that store a cache that includes a plurality of cached data objects. The cached data objects may include a first cached data object that corresponds to a first network data object of the network data objects. For example, the first network data object may be one or more of a modified version, a different version, or a new version of the first cached data object. For illustrative purposes, with respect to FIGS. 2A and 2B, the cached data objects may include the asset files of the initial build in the cache, the first cached data object may be the Object1 associated with "[hash1.0]" in the cache, the network data objects may include the asset files of the subsequent build at the network service, and the first network data object may be the Object1 associated with "[hash1.1]."

The object manager module 114 may be configured to obtain a request from the client device for the first network data object. By way of example, initiation of the request by the client device may be responsive to a determination that a first hash of a plurality of cache-object hashes and a second hash of the network-object hashes do not match. The cache-object hashes may, for instance, be associated with individual ones of the cached data objects. The first hash may be associated with the first cached data object, and the second hash may be associated with the first network data object. For example, referring to FIGS. 2A and 2B, the first hash may be "[hash1.0]," and the second hash may be "[hash1.1]." As such, the client device 104 may initiate the request for Object1 of the subsequent build from the network service based on a determination that the MD5 hashes "[hash1.0]" and "[hash1.1]" do not match.

In various implementations, a comparison at the client device 104 between a first address associated with the first cached data object and a second address associated with the first network data object may cause the determination that the first and second hashes do not match. The first address may include the first hash, the second address may include the second hash, and the first and second addresses may include a network address associated with the first cached data object and the first network data object.

By way of example, when the first address was initially used by the client device 104 (e.g., via a browser application) to download the first cached data object, the first cached data object and the first address may have been saved as a cache entry in the cache of the client device 104. As such, when the first address is subsequently used to access the first cached data object, the client device 104 may retrieve the first cached data object from the cache rather than from the network service. However, if the first network data object is a modified, different, and/or new version of the first cached data object, the second hash may be different from the first hash. As such, the second address associated with the first network data object may be different from the first address, and may not match any entries in the cache. As a result, when the second address is used to access the first network data object for the first time, the client device 104 may determine that the first network data object is not currently stored in the cache, and initiate downloading of the first network data object from the network service.

With respect to FIGS. 2A and 2B, for instance, the first address may be "http://www.game1.com/Object1.file/[hash1.0]," the second address may be "http://www.game1.com/Object1.file/[hash1.1], and the network address may be "http://www.game1.com/Object1.file." The first address may be utilized by the client device 104 to access Object1 of the initial build on the network service, and the second address may be utilized by the client device 104 to access Object1 of the subsequent build on the network service. In some implementations, the network address may be an alternative address for accessing Object1 of the initial build on the network service before the implementation of the subsequent build, and/or for accessing Object1 of the subsequent build on the network service after the implementation of the subsequent build. In certain implementations, the network address may be part of a URL for accessing the first cached data object and/or the first network data object on the network service (e.g., "http://www.game1.com"), and the respective MD5 hashes may be another part of the URL for accessing the first cached data object and/or the first network data object. For example, if the MD5 hash for the first network data object is "[hash1.1]," the URL for accessing the first network data object may be "http://www.game1.com/[hash1.1]."

The client device(s) 104 may be configured to execute one or more computer program modules. The computer program modules may be configured to enable an expert or user associated with the client device 104 to interface with system 100 and/or provide other functionality attributed herein to client device(s) 104. By way of example, the client device 104 may include one or more of a desktop computer, a laptop computer, a handheld computer, a netbook, a smartphone, a gaming console, and/or other computing devices. The computer program modules may include one or more of a browser module 116, an object record module 118, an update record module 120, an object retrieval module 122, an address generation module 124, a comparison module 126, a caching module 128, and/or other modules.

As mentioned, in some implementations, the client device 104 may include non-transient electronic storage media (e.g., electronic storage 130) that store a cache that includes a plurality of cached data objects such that cached data objects may include a first cached data object. Referring to FIG. 2A, for example, the cached data objects may include the asset files of the initial build in the cache, and the first cached data object may be the Object1 associated with "[hash1.0]" in the cache. As an example, the cache may be one or more of a web cache or a browser cache associated with the client device 104.

Figure 3:
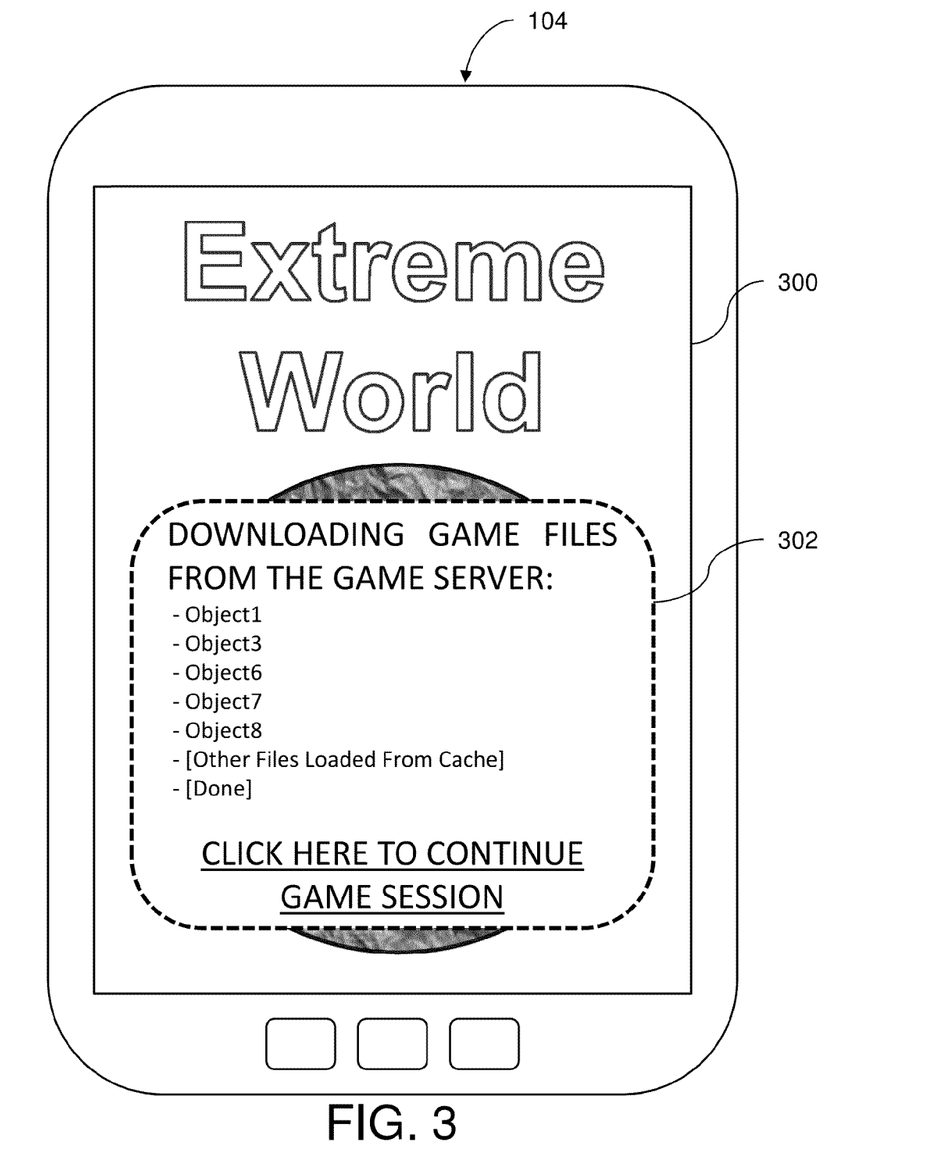
FIG. 3 illustrates a scenario of a client device performing selective retrieval of data objects from a network service, in accordance with one or more implementations.

The browser module 116 may execute one or more browser applications, such as a web browser and/or other browser applications. The browser module 116 may be configured (e.g., via the browser applications) to present information to a user, receive information from the user, and/or otherwise facilitate the user interacting with system 100. For example, FIG. 3 illustrates a scenario of the client device 104 performing selective retrieval of data objects from a network service, in accordance with one or more implementations. As shown, for instance, the browser module 116 may enable a user to initiate a browser application 300 to login and connect to the network service to play the game "Extreme World." When the browser application 300 connects to the network service, the browser application 300 may initiate loading of the game files selectively from the game server (e.g., via a network service), the browser cache, and/or from some other location. As depicted by notification 302, for instance, the browser application 300 has downloaded Object1, Object3, Object6, Object7, and Object8 from the game server, and has retrieved the other game files from the browser cache. As indicated, the selective retrieval of the game files may be based on a comparison of hashes of the game files at the game server and the hashes of the game files already stored in the browser cache (e.g., via a comparison of the respective addresses of the two sets of game files) such that individual game files at the game server that have been modified from the version of the corresponding games files in the browser cache may be downloaded from the game server.

The object record module 118 may be configured to obtain a plurality of cache-object hashes associated with individual ones of the cached data objects such that the cache-object hashes may include a first hash associated with the first cached data object. For example, with respect to FIG. 2A, the first cached data object may be the Object1 associated with "[hash1.0]," and the first hash may be "[hash1.0]." In some implementations, the cache-object hashes may be obtained by deriving the hashes from cache entries, looking up the hashes in table 200, and/or using other techniques.

The update record module 120 may be configured to obtain a plurality of network-object hashes associated with individual ones of a plurality of network data objects at the network service. At least some of the network data objects may correspond to the cached data objects such that the network data objects may include a first network data object that correspond to the first cached data object. The network-object hashes may include a second hash associated with the first network data object. By way of example, the first network data object may one or more of a modified version, a different version, or a new version of the first cached data object. Referring to FIG. 2B, for instance, the first network data object may be the Object1 associated with "[hash1.1]," and the second hash may be "[hash1.1]." The network-object hashes, including the second hash, may be obtained by looking up the hashes in table 202 and/or using other techniques. For example, the table 202 or a list of the network-object hashes may be provided to the update record module 120 by the network service.

The object retrieval module 122 may be configured to obtain the first network data object from the network service responsive to a determination that the first and second hashes do not match. The object retrieval module 122 may be configured to effectuate bypass of the obtaining of the first network data object from the network service responsive to a determination that the first and second hashes match. Referring to FIGS. 2A and 2B, for instance, if the first and second hashes are "[hash1.0]" and "[hash1.1]," respectively, the object retrieval module 122 may download the Object1 associated with the subsequent build from the network service after determining that the MD5 hashes "[hash1.0]" and "[hash1.1]" are different. However, if the first and second hashes are both "[hash2.0]" (e.g., the Object2 file is the same in the initial and subsequent builds), the object retrieval module 122 may skip downloading of Object2 from the network service and may, instead, retrieve Object2 from the cache of the client device 104.

According to certain implementations, the object record module 118 may be configured to obtain a first address that includes a plurality of portions. The portions may include a first portion that specifies a network address associated with the first cached data object and the first network data object, and a second portion that specifies the first hash. In some implementations, the address generation module 124 may be configured to effectuate generation of a second address using the network address and the second hash. For example, with respect to FIGS. 2A and 2B, the first address may be "http://www.gametcom/Objecttfile/[hash1.0]," which may have previously been generated and stored in the cache as a cache entry along with Object1 of the initial build. In this scenario, the network address for the first address may be "http://www.game1.com/Object1.file," and the second address may be generated by appending the MD5 hash "[hash1.1]" of the first network data object to the network address to produce "http://www.game1.com/Object1.file/[hash1.1]."

In certain implementations, the network address may be part of a URL for accessing the first cached data object and/or the first network data object on the network service (e.g., "http://www.game1.com"), and the respective MD5 hashes may be another part of the URL for accessing the first cached data object and/or the first network data object. For example, if the MD5 hash for the first network data object is "[hash1.1]," the URL for accessing the first network data object may be "http://www.game1.com/[hash1.1]."

The comparison module 126 may be configured to effectuate comparison of the first and second addresses such that the comparison may cause the determination that the first and second hashes do not match. With respect to FIGS. 2A and 2B, the first address may be "http://www.gametcom/Objecttfile/[hash1.0]," and the second address may be "http://www.game1.com/Object1.file/[hash1.1]." Upon comparison of the two addresses, the comparison module 126 may determine that the first and second addresses are different. Consequently, Object1 may be re-downloaded from the network service.

The caching module 128 may be configured to effectuate storage of the first network data object in the cache responsive to the obtaining of the first network data object from the network service. By way of example, the first network data object may be stored in the cache with the second address (e.g., Object1 may be stored in the cached with "http://www.gametcom/Object1.file/[hash1.1]"). Accordingly, when the second address is subsequently used to initial retrieval of the first network data object, the first network data object may be retrieved from the cache rather than the network service.

As discussed, in some implementations, the network service may be associated with one or more of a virtual world, a virtual space, or a video game. Virtual worlds, virtual spaces, and/or video games may, for instance, include computer-simulated environments. Virtual worlds, virtual spaces, and/or video games may be designed to be populated by avatars (e.g., virtual representations of users of the computer-simulated environments), to enable communication between users, to offer persistence of user-created content, to offer functional economies, or to provide other features. An instance of the virtual world, the virtual space, and/or the video game may be executed by computer modules to determine views of the virtual world, the virtual space, and/or the video game. The views may then be communicated (e.g., via streaming, via object/position data, and/or other information) from server(s) 102 and/or other source to client device(s) 104 for presentation to users. The view determined and transmitted to a given client device 104 may correspond to a user character being controlled by a user via the given client device 104. The view determined and transmitted to a given client device 104 may correspond to a location in the virtual world, the virtual space, and/or the video game (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual world, the virtual space, and/or the video game may comprise a simulated environment that is accessible by users via clients (e.g., client device(s) 104) that present the views of the virtual world, the virtual space, and/or the video game to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual world, the virtual space, and/or the video game are determined is not intended to be limiting. The virtual world, the virtual space, and/or the video game may be expressed in a more limited, or more rich, manner. For example, views determined for the virtual world, the virtual space, and/or the video game may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual world, the virtual space, and/or the video game are contemplated.

Within the instance(s) of the virtual world, the virtual space, and/or the video game, users may control characters, objects, simulated physical phenomena (e.g., wind, rain, earthquakes, and/or other phenomena), and/or other elements within the virtual world, the virtual space, and/or the video game to interact with virtual world, the virtual space, and/or the video game as well as each other. The user characters may include avatars. As used herein, the term "user character" may refer to an object (or group of objects) present in the virtual world, the virtual space, and/or the video game that represents an individual user. The user character may be controlled by the user with which it is associated. The user controlled element(s) may move through and interact with the virtual world, the virtual space, and/or the video game (e.g., non-user characters or other objects in the virtual world, the virtual space, and/or the video game). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual world, the virtual space, and/or the video game.

The users may participate in the instance of the virtual world, the virtual space, and/or the video game by controlling one or more of the available user controlled elements in the virtual world, the virtual space, and/or the video game. Control may be exercised through control inputs and/or commands input by the users through client device(s) 104. The users may interact with each other through communications exchanged within the virtual world, the virtual space, and/or the video game. Such communications may include one or more of textual chat, instant messages, private messages, voice communications, and/or other communications. Communications may be received and entered by the users via their respective client device(s) 104. Communications may be routed to and from the appropriate users through server(s) 102.

In some implementations, server(s) 102, client device(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client device(s) 104, and/or external resources 132 may be operatively linked via some other communication media.

The external resources 132 may include sources of information (e.g., data object information and/or other information), hosts and/or providers of virtual worlds, virtual spaces, and/or video games outside of system 100, external entities participating with system 100, and/or other resources. In some implementations, some or all of the functionality attributed herein to external resources 132 may be provided by resources included in system 100.

The server(s) 102 may include electronic storage 134, one or more processors 136, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

The electronic storages 130 and 134 may comprise electronic storage media that electronically stores information. The electronic storage media of electronic storages 130 and 134 may include one or both of system storage that is provided integrally (i.e., substantially non-removable) with server(s) 102 and/or client device(s) 104, and/or removable storage that is removably connectable to server(s) 102 and/or client device(s) via, for example, a port (e.g., a USB port, a firewire port, etc.) or a drive (e.g., a disk drive, etc.). The electronic storages 130 and 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages 130 and 134 may include one or more virtual storage resources (e.g., cloud storage, a virtual private network, and/or other virtual storage resources). The electronic storages 130 and 134 may store software algorithms, information determined by processors 136 and 138, information received from server(s) 102, information received from client device(s) 104, information received from external resources 132, and/or other information that enables server(s) 102 or client device(s) 104 to function as described herein.

The processors 136 and 138 may be configured to provide information processing capabilities in server(s) 102 and client device(s) 104, respectively. As such, processors 136 and 138 may include one or more of a digital processor, an analog processor, a digital circuit designed to process information, an analog circuit designed to process information, a state machine, and/or other mechanisms for electronically processing information. Although processors 136 and 138 are shown in FIG. 1 as single entities, this is for illustrative purposes only. In some implementations, each of processors 136 and 138 may include a plurality of processing units. These processing units may be physically located within the same device, or processors 136 and 138 may individually represent processing functionality of a plurality of devices operating in coordination. The processors 136 and 138 may respectively be configured to execute modules 110, 112, 114, 116, 118, 120, 122, 124, 126, 128, and/or other modules by software; hardware; firmware; some combination of software, hardware, and/or firmware; and/or other mechanisms for configuring processing capabilities on processors 136 and 138.

It should be appreciated that although modules 110, 112, and 114 are illustrated in FIG. 1 as being co-located within a single processing unit, in implementations in which processor(s) 136 includes multiple processing units, one or more of modules 110, 112, and/or 114 may be located remotely from the other modules. Likewise, although modules 116, 118, 120, 122, 124, 126, and 128 are illustrated in FIG. 1 as being co-located within a single processing unit, in implementations in which processor(s) 138 includes multiple processing units, one or more of modules 116, 118, 120, 122, 124, 126, and 128 may be located remotely from the other modules. The description of the functionality provided by the different modules 110, 112, 114, 116, 118, 120, 122, 124, 126, and/or 128 described below is for illustrative purposes, and is not intended to be limiting, as any of modules 110, 112, 114, 116, 118, 120, 122, 124, 126, and/or 128 may provide more or less functionality than is described. For example, one or more of modules 110, 112, 114, 116, 118, 120, 122, 124, 126, and/or 128 may be eliminated, and some or all of its functionality may be provided by other ones of modules 110, 112, 114, 116, 118, 120, 122, 124, 126, and/or 128. As another example, processors 136 and 138 may individually be configured to execute one or more additional modules that may perform some or all of the functionality attributed below to one of modules 110, 112, 114, 116, 118, 120, 122, 124, 126, and/or 128.

Figure 4:
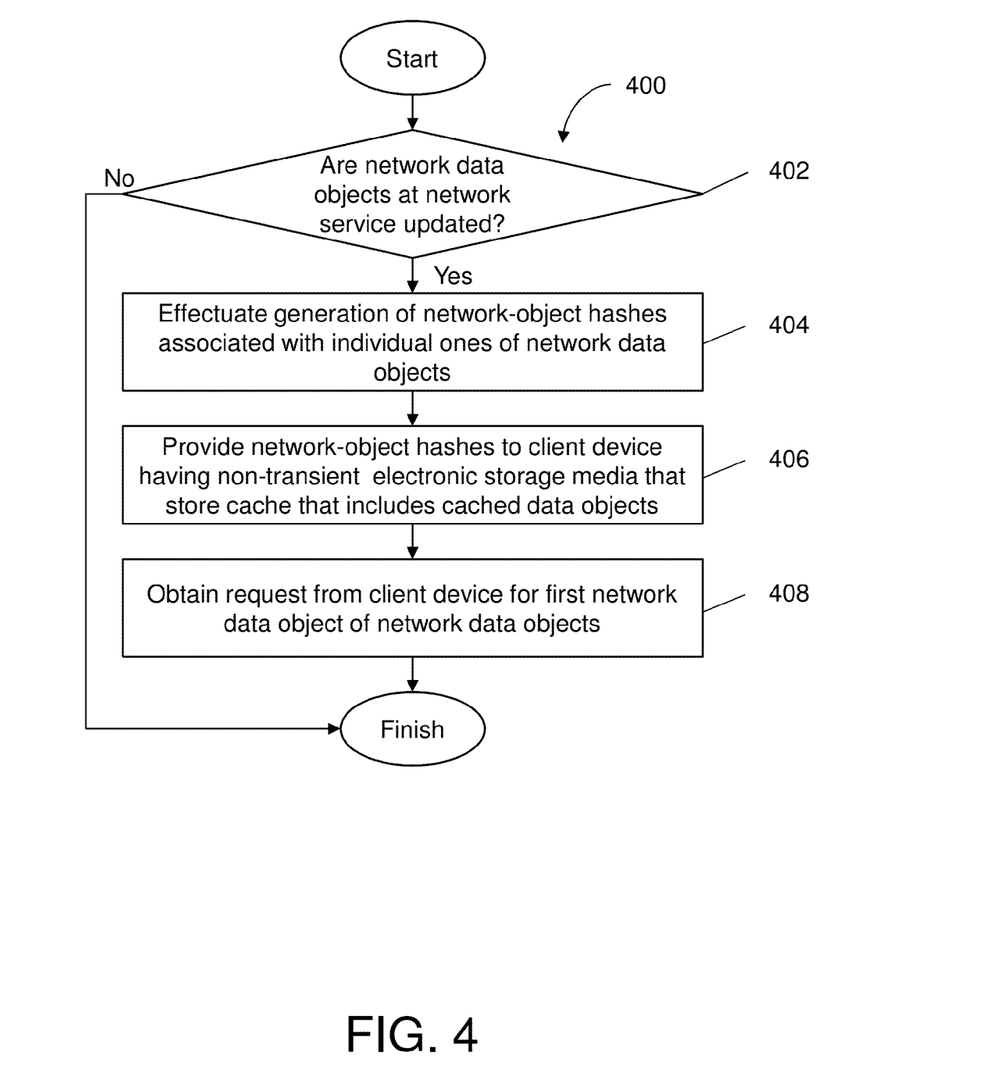
FIG. 4 illustrates a method for facilitating selective retrieval of network data objects from a network service by providing network-object hashes to client devices, in accordance with one or more implementations.

FIG. 4 illustrates a method 400 for facilitating selective retrieval of network data objects from a network service by providing network-object hashes to client devices, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a determination of whether a plurality of network data objects (that include a first network data object) at the network service have been updated may be effectuated. Operation 402 may be performed by a network update module that is the same as or similar to network update module 112, in accordance with one or more implementations. Responsive to a determination that the network data objects have been updated, method 400 may proceed to an operation 404.

At operation 404, generation of a plurality of network-object hashes associated with individual ones of the network data objects may be effectuated. Operation 404 may be performed by a hash generation module that is the same as or similar to hash generation module 110, in accordance with one or more implementations.

At an operation 406, the network-object hashes may be provided to a client device having non-transient electronic storage media that store a cache that includes a plurality of cached data objects, the cached data objects including a first cached data object that corresponds to the first network data object. Operation 406 may be performed by a network update module that is the same as or similar to network update module 112, in accordance with one or more implementations.

At an operation 408, a request from the client device for the first network data object may be obtained. Initiation of the request by the client device may be responsive to a determination that a first hash of a plurality of cache-object hashes and a second hash of the network-object hashes do not match. The cache-object hashes may be associated with individual ones of the cached data objects. The first hash may be associated with the first cached data object. The second hash may be associated with the first network data object. Operation 408 may be performed by an object manager module that is the same as or similar to object manager module 114, in accordance with one or more implementations.

Figure 5:
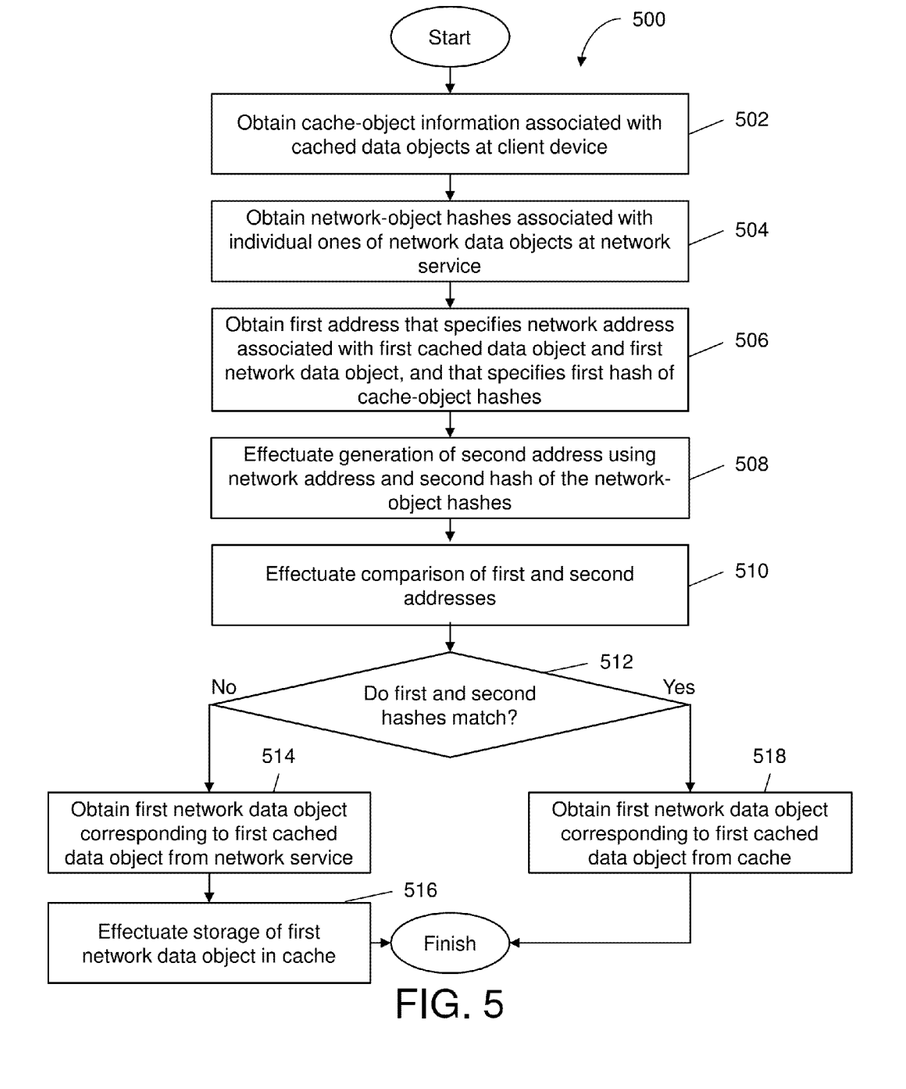
FIG. 5 illustrates a method for facilitating selective retrieval of network data objects from a network service by comparing network-object hashes of the network data objects with cache-object hashes of corresponding cache data objects, in accordance with one or more implementations.

FIG. 5 illustrates a method 500 for facilitating selective retrieval of network data objects from a network service by comparing network-object hashes of the network data objects with cache-object hashes of corresponding cache data objects, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, cache-object information associated with a plurality of cached data objects at a client device may be obtained. The cache-object information may be obtained from a cached stored on non-transient electronic storage media of the client device, and may include one or more of a plurality of cache-object hashes, a plurality of cache-object addresses, or other information. The cached-object hashes may include a first hash associated with a first cached data object of the cached data objects. The cache-object addresses may include a first address associated with the first cached data object. Operation 502 may be performed by an object record module module that is the same as or similar to object record module 118, in accordance with one or more implementations.

At an operation 504, the first address may be obtained (e.g., from the cache-object information). The first address may include a plurality of portions having a first portion that specifies a network address associated with the first cached data object, and a second portion that specifies the first hash. Operation 504 may be performed by an object record module that is the same as or similar to object record module 118, in accordance with one or more implementations.

At an operation 506, a plurality of network-object hashes associated with individual ones of a plurality of network data objects may be obtained. At least some of the network data objects may correspond to the cached data objects such that the network data objects include a first network data object that correspond to the first cached data object. The network-object hashes may include a second hash associated with the first network data object. Operation 506 may be performed by an update record module that is the same as or similar to update record module 120, in accordance with one or more implementations.

At an operation 508, generation of a second address using the network address and the second hash using the network address and the second hash may be effectuated. Operation 508 may be performed by an address generation module that is the same as or similar to address generation module 124, in accordance with one or more implementations.

At an operation 510, comparison of the first and second addresses may be effectuated. Operation 510 may be performed by a comparison module that is the same as or similar to comparison module 126, in accordance with one or more implementations.

At an operation 512, a determination of whether the first and second hashes match may be effectuated (e.g., based on the comparison of the first and second addresses). Operation 512 may be performed by a comparison module that is the same as or similar to comparison module 126, in accordance with one or more implementations. Responsive to a determination that the first and second hashes do not match, method 500 may proceed to an operation 514. Responsive to a determination that the first and second hashes match, method 500 may proceed to an operation 518.

At operation 514, obtain the first network data object may be obtained from the network service. Operation 514 may be performed by an object retrieval module that is the same as or similar to object retrieval module 122, in accordance with one or more implementations.

At an operation 516, storage of the first network data object in the cache may be effectuated responsive to the obtaining of the first network data object from the network service. Operation 516 may be performed by a caching module that is the same as or similar to caching module 128, in accordance with one or more implementations.

At operation 518, bypass of the obtaining of the first network data from the network service may be effectuated by, for example, obtaining the first network data object correspond to the first cached data object from the cache. Operation 518 may be performed by an object retrieval module that is the same as or similar to object retrieval module 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation

What is claimed is:

1. A system configured to facilitate selective retrieval of data objects from a network service to a client device, the system comprising:
 a server comprising one or more processors and a memory configured to execute computer program modules, the computer program modules comprising:
  a hash generation module configured to effectuate generation of a plurality of network-object hashes associated with individual ones of a plurality of network data objects at the network service, the plurality of network data objects including a first network data object;
  a network update module configured to provide the plurality of network-object hashes to the client device, the client device having non-transient electronic storage media that store a cache that includes a plurality of cached data objects and one or more processors configured by machine-readable instructions to perform one or more functions defined by the machine-readable instructions, the plurality of cached data objects including a first cached data object that corresponds to the first network data object; and an object manager module configured to obtain a request generated by the one or more processors of the client device for the first network data object, wherein initiation of the request by the client device is responsive to a determination by the client device, using the one or more processors of the client device, that a first hash of a plurality of cache-object hashes and a second hash of the plurality of network-object hashes do not match, the plurality of cache-object hashes are associated with individual ones of the plurality of cached data objects, the first hash is associated with the first cached data object, and the second hash is associated with the first network data object, wherein the determination by the client device includes comparing, at the client device, a first network address that includes the first hash associated with the first cached data object and a second network address that includes the second hash associated with the first network data object, and wherein the first network data object is one or more of a modified version, a different version, or a new version of the first cached data object.

2. The system of claim 1, wherein the network update module is further configured to determine that the plurality of network data objects have been updated, and the generation of the plurality of network-object hashes is responsive to the determination that the plurality of network data objects have been updated.

3. The system of claim 1, wherein the network service is associated with one or more of a virtual world, a virtual space, or a video game.

4. A method for facilitating selective retrieval of data objects from a network service to a client device, the method comprising:

effectuating generation, by a server having one or more of a plurality of network-object hashes associated with individual ones of a plurality of network data objects at the network service, the plurality of network data objects including a first network data object;

providing the plurality of network-object hashes to the client device, the client device having non-transient electronic storage media that store a cache that includes a plurality of cached data objects and one or more processors configured by machine-readable instructions to perform one or more functions defined by the machine-readable instructions, the plurality of cached data objects including a first cached data object that corresponds to the first network data object; and obtaining a request generated by the one or more processors of the client device for the first network data object, wherein initiation of the request by the client device is responsive to a determination by the client device, using the one or more processors of the client device, that a first hash of a plurality of cache-object hashes and a second hash of the plurality of network-object hashes do not match, the plurality of cache-object hashes are associated with individual ones of the plurality of cached data objects, the first hash is associated with the first cached data object, and the second hash is associated with the first network data object, wherein the determination by the client device includes comparing, at the client device, a first network address that includes the first hash associated with the first cached data object and a second network address that includes the second hash associated with the first network data object, and wherein the first network data object is one or more of a modified version, a different version, or a new version of the first cached data object.

5. The method of claim 4, wherein the generation of the plurality of network-object hashes is responsive to a determination that the plurality of network data objects have been updated.

6. The method of claim 4, wherein the network service is associated with one or more of a virtual world, a virtual space, or a video game.

7. A client device configured to facilitate selective retrieval of data objects from a network service server, the client device comprising:

non-transient electronic storage media that store a cache that includes a plurality of cached data objects, the plurality of cached data objects including a first cached data object; and one or more processors and a memory configured to execute computer program modules, the computer program modules comprising:

an object record module configured to obtain a plurality of cache-object hashes, from the network service server, associated with individual ones of the plurality of cached data objects such that the plurality of cache-object hashes include a first hash associated with the first cached data object;

an update record module configured to obtain, from the network service server, a plurality of network-object hashes associated with individual ones of a plurality of network data objects at the network service server, wherein at least some of the plurality of network data objects correspond to the plurality of cached data objects such that the plurality of network data objects include a first network data object that corresponds to the first cached data object, and the plurality of network-object hashes include a second hash associated with the first network data object; and an object retrieval module configured to obtain, from the network service server, the first network data object from the network service server responsive to a determination, by the one or more processors of the client device, that the first and second hashes do not match, wherein the determination by the client device includes comparing, at the client device, a first network address that includes the first hash associated with the first cached data object and a second network address that includes the second hash associated with the first network data object, and wherein the first network data object is one or more of a modified version, a different version, or a new version of the first cached data object.

8. The system of claim 7, wherein the object retrieval module is further configured to effectuate bypass of the obtaining of the first network data object from the network service server responsive to a determination that the first and second hashes match.

9. The system of claim 7, wherein the cache is one or more of a web cache or a browser cache associated with the client device.

10. The system of claim 7, wherein the computer program modules further comprise a caching module configured to effectuate storage of the first network data object in the cache responsive to the obtaining of the first network data object from the network service server.

11. The system of claim 7, wherein the object record module is further configured to obtain a first address that includes a plurality of portions, the portions including a first portion that specifies a network address associated with the first cached data object and the first network data object, and a second portion that specifies the first hash, and wherein the computer program modules further comprise an address generation module configured to effectuate generation of a second address using the network address and the second hash.

12. The system of claim 7, wherein the network service server is associated with one or more of a virtual world, a virtual space, or a video game.

* * * * *